United States Patent
Greuel et al.

(10) Patent No.: US 8,464,803 B2
(45) Date of Patent: Jun. 18, 2013

(54) DCM HAVING ADJUSTABLE WEAR ASSEMBLY

(75) Inventors: Andrew G. Greuel, Mt. Zion, IL (US);
Anthony J. Piraino, Oakley, IL (US);
Jacob P. Fawer, Decatur, IL (US);
Daniel E. Bozich, Springfield, IL (US)

(73) Assignee: Caterpillar Inc., Peoria, IL (US)

( * ) Notice: Subject to any disclaimer, the term of this patent is extended or adjusted under 35 U.S.C. 154(b) by 252 days.

(21) Appl. No.: 12/945,211

(22) Filed: Nov. 12, 2010

(65) Prior Publication Data
US 2011/0247845 A1   Oct. 13, 2011

Related U.S. Application Data

(60) Provisional application No. 61/321,717, filed on Apr. 7, 2010.

(51) Int. Cl.
*E02F 3/76*   (2006.01)

(52) U.S. Cl.
USPC .......................................................... 172/795

(58) Field of Classification Search
USPC ................ 172/677, 747, 791–797, 781, 805; 414/66–69
See application file for complete search history.

(56) References Cited

U.S. PATENT DOCUMENTS

| | | |
|---|---|---|
| 3,712,384 A | 1/1973 | Fisher |
| 3,856,089 A | 12/1974 | Rivinius |
| 4,058,174 A | 11/1977 | Atherton et al. |
| 4,084,644 A | 4/1978 | Cole et al. |
| 4,105,078 A | 8/1978 | Gilbert |
| 5,060,465 A | 10/1991 | Jerome |
| 5,076,370 A | 12/1991 | Stubben et al. |
| 5,667,020 A | 9/1997 | Palmer et al. |
| 5,720,353 A | 2/1998 | Wilkening |
| 6,082,516 A | 7/2000 | Willer |
| 6,230,818 B1 | 5/2001 | Slunder |
| 6,278,955 B1 | 8/2001 | Hartman et al. |
| 6,585,059 B2 | 7/2003 | Michael, Jr. et al. |
| 6,758,286 B2 | 7/2004 | Walker |
| 6,799,640 B2 | 10/2004 | McGugan |
| 6,851,485 B2 | 2/2005 | Maeda et al. |
| 6,904,978 B2 | 6/2005 | McGugan |
| 7,090,070 B2 | 8/2006 | Linder |
| 7,121,355 B2 | 10/2006 | Lumpkins et al. |
| 7,575,068 B2 | 8/2009 | Stubben |
| 2002/0060081 A1 | 5/2002 | Mcgugan |
| 2003/0042029 A1 | 3/2003 | Michael, Jr. et al. |

(Continued)

FOREIGN PATENT DOCUMENTS

| | | |
|---|---|---|
| EP | 1188359 | 3/2002 |
| KR | 100969252 | 7/2010 |

OTHER PUBLICATIONS

U.S. Patent Application of Andrew G. Greuel entitled "DCM Circle Shoe Having Angled Wear Insert", filed on Nov. 12, 2010.

*Primary Examiner* — Robert Pezzuto
(74) *Attorney, Agent, or Firm* — Finnegan, Henderson, Farabow, Garrett & Dunner LLP

(57) ABSTRACT

An adjustable wear assembly for a machine mounting component having a channel is disclosed. The adjustable wear assembly may have a wear insert located within the channel, and an inclined adjustment plate located within the channel in contact with the wear insert. The adjustable wear assembly may also have at least one wedge block located within the channel in contact with the inclined adjustment plate, and a cover connectable to the mounting component to close off a side of the channel.

19 Claims, 16 Drawing Sheets

U.S. PATENT DOCUMENTS

| | | |
|---|---|---|
| 2004/0000413 A1 | 1/2004 | Walker |
| 2004/0149463 A1 | 8/2004 | Maeda et al. |
| 2008/0110651 A1 | 5/2008 | Stubben |
| 2008/0127530 A1 | 6/2008 | Kelly |
| 2008/0138154 A1 | 6/2008 | Horstman et al. |
| 2009/0000159 A1 | 1/2009 | Breken |
| 2009/0056961 A1 | 3/2009 | Gharsalli et al. |

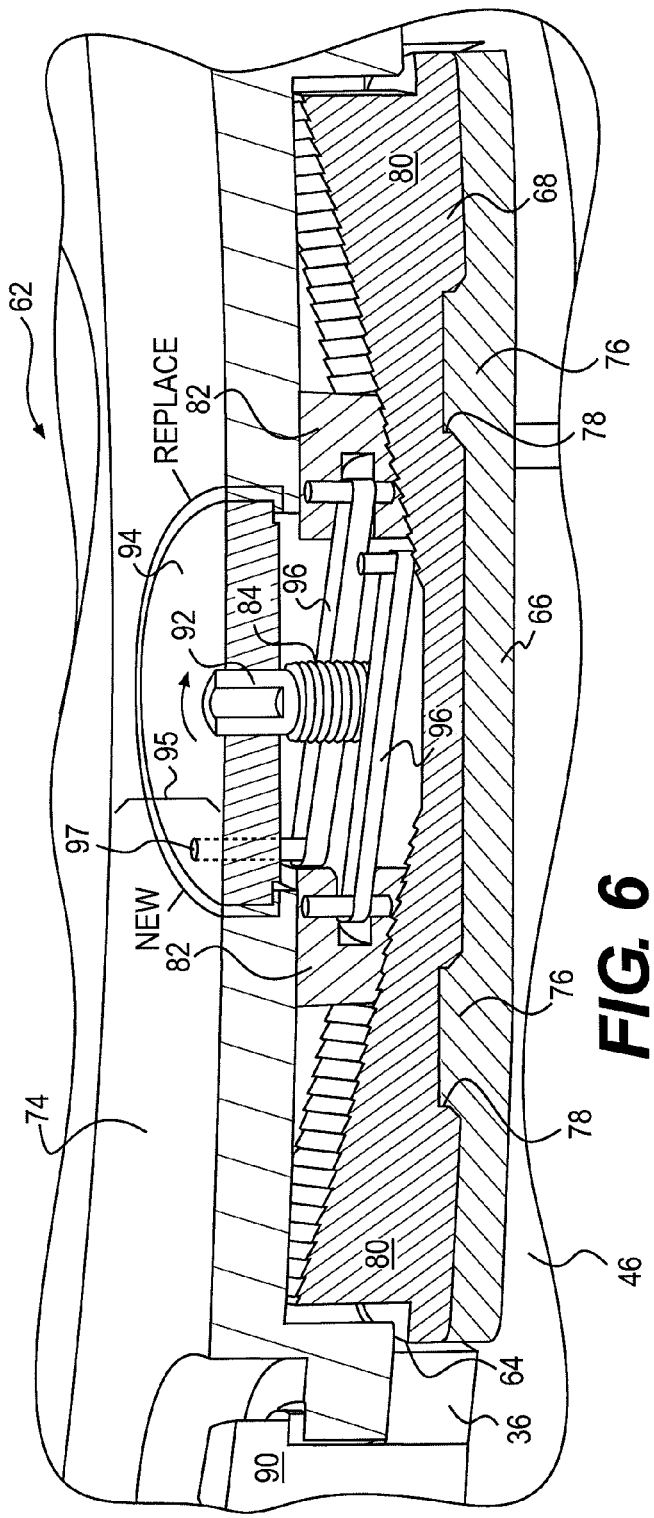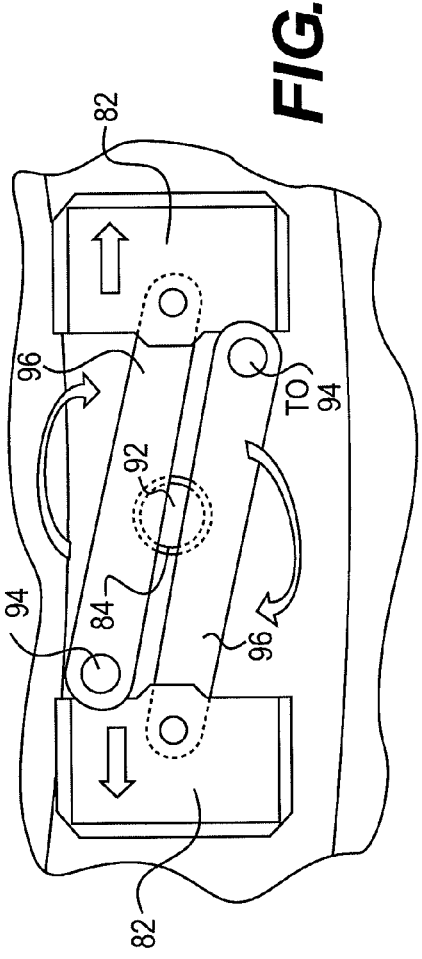

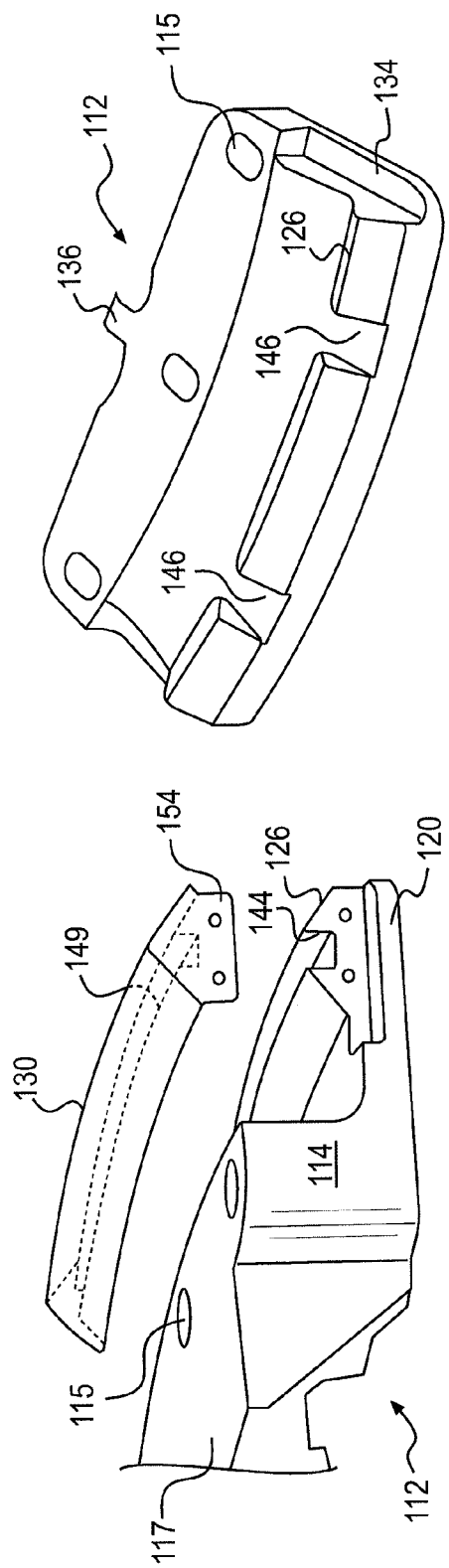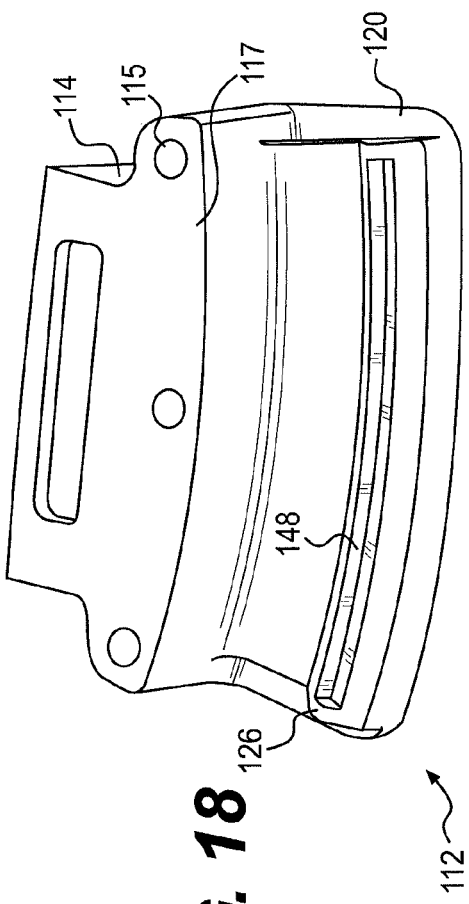

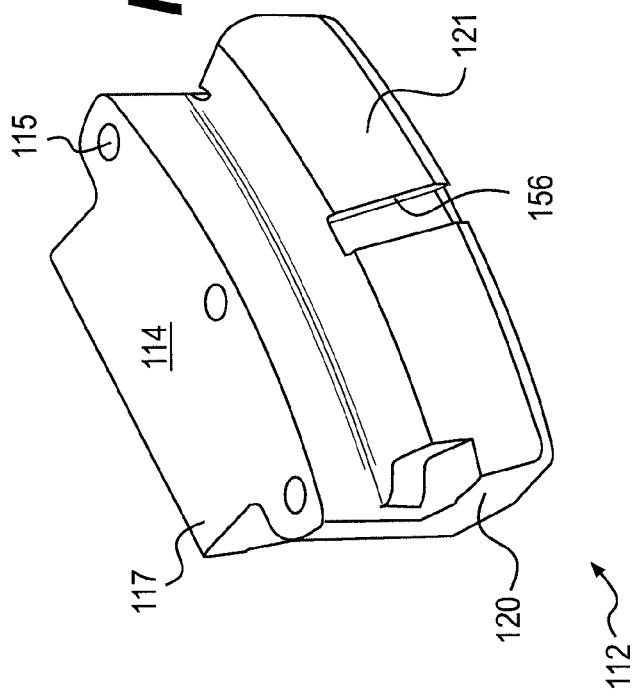
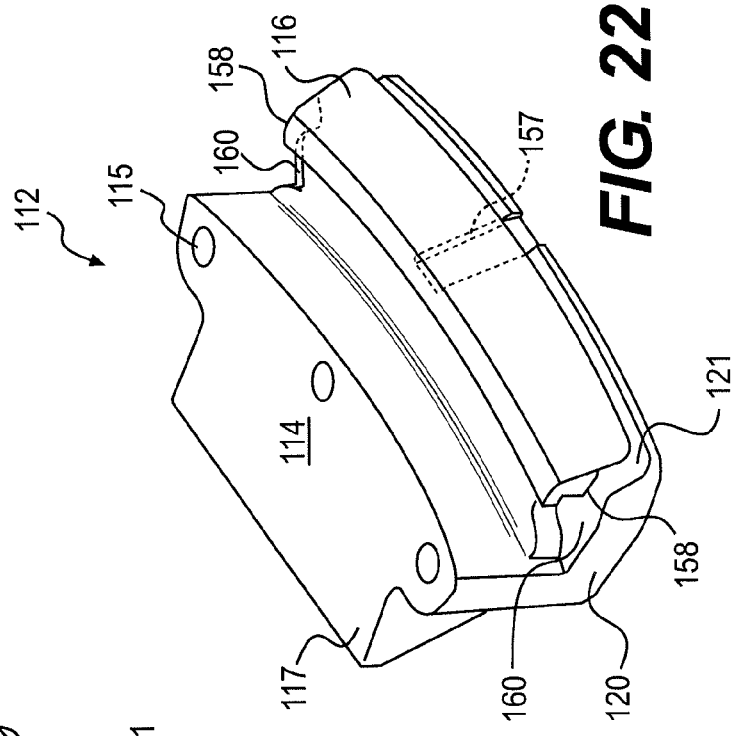

DCM HAVING ADJUSTABLE WEAR ASSEMBLY

RELATED APPLICATIONS

This application is based on and claims the benefit of priority from U.S. Provisional Application No. 61/321,717 by Andrew G. Greuel, Nikhil Sharma, and Jacob P. Fawer, filed Apr. 7, 2010, the contents of which are expressly incorporated herein by reference.

TECHNICAL FIELD

The present disclosure relates generally to a drawbar-circle-moldboard (DCM), and more particularly to a DCM having an adjustable wear assembly.

BACKGROUND

Machines, for example motor graders, are commonly used in earth leveling applications such as road maintenance or surface contouring. Motor graders typically have a steerable front frame and a driven rear frame connected to the front frame by an articulation joint. The front frame supports a movable drawbar-circle-moldboard (DCM) that holds a work implement used to perform the leveling operations. The DCM is suspended from a main beam of the front frame and has a yoke extending forward toward and pivotally connected to the front frame. Movement of the DCM relative to the front frame results in a corresponding movement of the work implement.

The work implement, typically a blade, is connected to a circle member of the DCM. The circle member is positioned relative to the yoke by way of shoes that allow relative rotation between the circle member and the yoke, but inhibit relative translation. During operation, the blade is exposed to significant forces and vibrations and, to reduce wear of the circle member and the yoke caused by operation, wear inserts made of a relatively softer sacrificial material are located between the shoes and the circle member and between the circle member and the yoke.

Over time, the softer material of the wear inserts erodes under normal conditions, and a clearance and relative movement between the shoes and the circle member and/or between the circle member and the yoke increases. This clearance and movement, if left unchecked, could result in improper positioning and/or orienting of the blade. An inaccurately positioned or oriented blade may not adequately perform an intended leveling operation.

In order to maintain desired DCM clearances, the wear inserts must be periodically adjusted and/or replaced. In some machines, maintenance of the wear inserts requires that the entire circle member and the shoes be completely removed from a bottom side of the yoke so that new wear strips and shims can be positioned between the circle member and the yoke. Although sufficient for some situations, this access to the wear inserts and performance of the associated adjustments can be difficult and require extensive time and labor.

One arrangement that allows access to and adjustment of the wear inserts with reduced time and labor is disclosed in U.S. Pat. No. 5,720,353 (the '353 patent) issued to Wilkening on Feb. 24, 1998. Specifically, the '353 patent discloses a yoke having a passageway extending therethrough, and a circle member movable relative to the yoke. The '353 patent also discloses a wear strip positioned within the passageway and located in contact with the circle member, and a shim positioned within the passageway and in contact with the wear strip. A holder is secured to a top surface of the yoke opposite the circle member to hold the shim and wear strip in place. After an operational period of time, when the wear strip has eroded by a significant amount, the holder is removed so as to expose the passageway. Thereafter, one or more supplemental shims are positioned within the passageway so that the supplemental shims and the wear strip are interposed between the circle member and the holder. In this manner, excessive clearance resulting from erosion of the wear strip is accommodated by the supplemental shims.

Although the top-adjust wear assembly of the '353 patent may offer reduced time and labor associated with maintenance of the wear strip, the assembly may still be less than optimal. In particular, the assembly still requires the wear strip to be serviced manually on a regular basis. This manual service results in lost productivity and an operational cost of the machine.

The drawbar-circle-moldboard of the present disclosure addresses one or more of the needs set forth above and/or other problems of the prior art.

SUMMARY

In one aspect, the present disclosure is directed to an adjustable wear assembly for a mounting component having a channel. The adjustable wear assembly may include a wear insert located within the channel, and an inclined adjustment plate located within the channel in contact with the wear insert. The adjustable wear assembly may also include at least one wedge block located within the channel in contact with the inclined adjustment plate, and a cover connectable to the mounting component to close off a side of the channel.

In another aspect, the present disclosure is directed to a wear insert for an adjustable wear assembly. The wear insert may include an arcuate non-metallic substrate having at least one generally planar wear surface and a generally opposing mounting surface. The wear insert may also include an interlocking feature associated with the mounting surface.

In another aspect, the present disclosure is directed to a drawbar assembly. The drawbar assembly may include a yoke having a plurality of channels annularly disposed about a periphery of the yoke, a circle member positioned at a bottom surface of the yoke, and a plurality of adjustable wear assemblies associated with the plurality of channels to space the circle member away from the yoke. Each of the plurality of adjustable wear assemblies may include a wear insert located within an associated channel of the plurality of channels, and an inclined adjustment plate located within the associated channel and having an interlocking feature configured to engage corresponding interlocking features of the wear insert. Each of the plurality of adjustable wear assemblies may also include at least one wedge block located within the associated channel in contact with the inclined adjustment plate, and a cover connectable to a top surface of the yoke to close off a side of the channel.

BRIEF DESCRIPTION OF THE DRAWINGS

FIG. 6 is a cross-sectional illustration of another exemplary disclosed adjustable wear assembly that may be utilized with the drawbar-circle-moldboard of FIGS. 2 and 3;

FIG. 7 is a top view illustration of the adjustable wear assembly of FIG. 6;

FIGS. 16-22 are pictorial illustrations of various wear insert configurations that may be utilized with the circle shoes of FIGS. 12-15.

DETAILED DESCRIPTION

Figure 1:
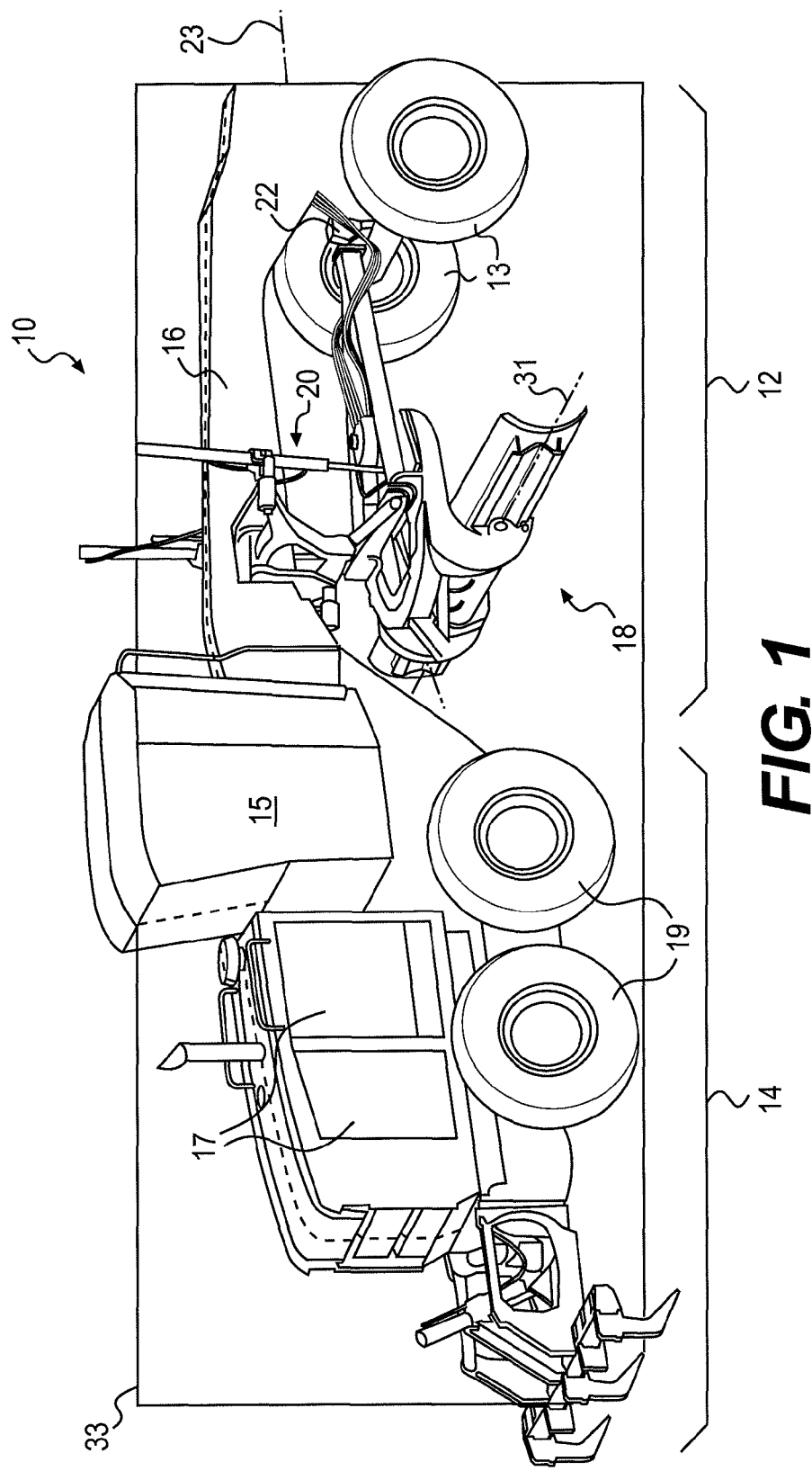
FIG. 1 is a pictorial illustration of an exemplary disclosed machine.

An exemplary embodiment of a machine 10 is illustrated in FIG. 1. Machine 10 may, for example, be a motor grader, a backhoe loader, an agricultural tractor, a wheel loader, a skid-steer loader, or any other type of machine known in the art. Machine 10 may include a steerable front frame 12 and a driven rear frame 14 connected to front frame 12. Front frame 12 may include a pair of front wheels 13, and support an operator station 15. Rear frame 14 may include compartments 17 for housing a power source and cooling components, the power source being operatively coupled to rear wheels 19 for primary propulsion of machine 10. Wheels 19 may be arranged in tandems on opposing sides of rear frame 14. Steering of machine 10 may be a function of both front wheel steering and articulation of front frame 12 relative to rear frame 14.

Machine 10 may also include an implement assembly such as, for example, a drawbar-circle-moldboard (DCM) 18, operatively connected to and supported by main beam 16 of front frame 12. It is contemplated that DCM 18 may be connected to and supported by another portion of machine 10, if desired, such as by another portion of front frame 12 or by rear frame 14. DCM 18 may be vertically supported by main beam 16 via a hydraulic ram assembly 20, and horizontally supported at a forward end by front frame 12 via a ball joint 22. Hydraulic ram assembly 20 may be configured to shift DCM 18 vertically toward and away from frame 16, shift DCM 18 side-to-side, and rotate DCM 18 about a horizontal axis 23 of ball joint 22. It is contemplated that DCM 18 may move in additional and/or different ways than described above, if desired.

Figure 2:
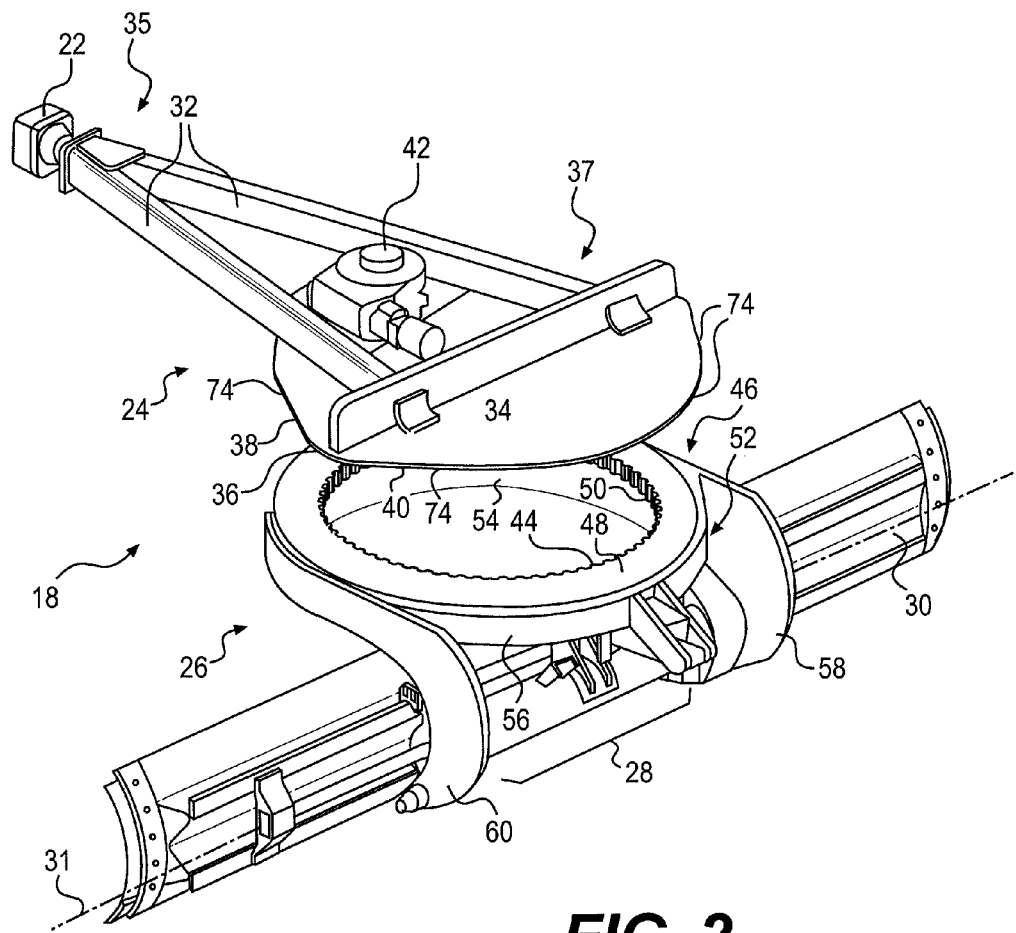
FIG. 2 is a pictorial illustration of an exemplary disclosed drawbar-circle-moldboard that may be utilized with the machine of FIG. 1.

As seen in FIG. 2, DCM 18 may include a yoke 24 that rotatably supports a circle assembly 26, and a hydraulic ram assembly 28 that connects a work implement 30 to circle assembly 26. Work implement 30 may include a blade, a ripper, or any other implement known in the art. Hydraulic ram assembly 28 may shift work implement 30 side-to-side relative to DCM 18, and rotate work implement 30 about a horizontal axis 31 that is generally orthogonal to a vertical mid-plane 33 of machine 10 (referring to FIG. 1).

Yoke 24 may include a pair of draw bars 32 positioned in a general V-shape or Y-shape and connected at a tip end 35 to ball joint 22 and at an opposing wider end 37 to a crossbar 34. Draw bars 32 and crossbar 34, at wider end 37, may be positioned on and mounted to a yoke plate 36 having an upper yoke surface 38 and a lower yoke surface 40. A motor 42 may also be mounted to upper yoke surface 38 of yoke plate 36 and include a drive gear (not shown) that extends through yoke plate 36 to mesh with internal teeth 44 of circle assembly 26 to rotate circle assembly 26 and connected work implement 30 relative to yoke 24.

Circle assembly 26 may include a circle member 46 having teeth 44 in the form of an integral ring gear, an upper surface 48, a lower surface 50, and a rim 52 protruding from lower surface 50 away from yoke 24. Rim 52 may include an inner annular surface 54 and an outer annular surface 56. Circle assembly 26 may also include a first implement beam 58 connected to and extending from one side of circle member 46 downward away from yoke 24, and a second implement beam 60 connected to and extending from an opposite side of circle member 46 downward away from yoke 24. First and second implement beams 58, 60 may support work implement 30 by way of hydraulic ram assembly 28.

Figure 3:
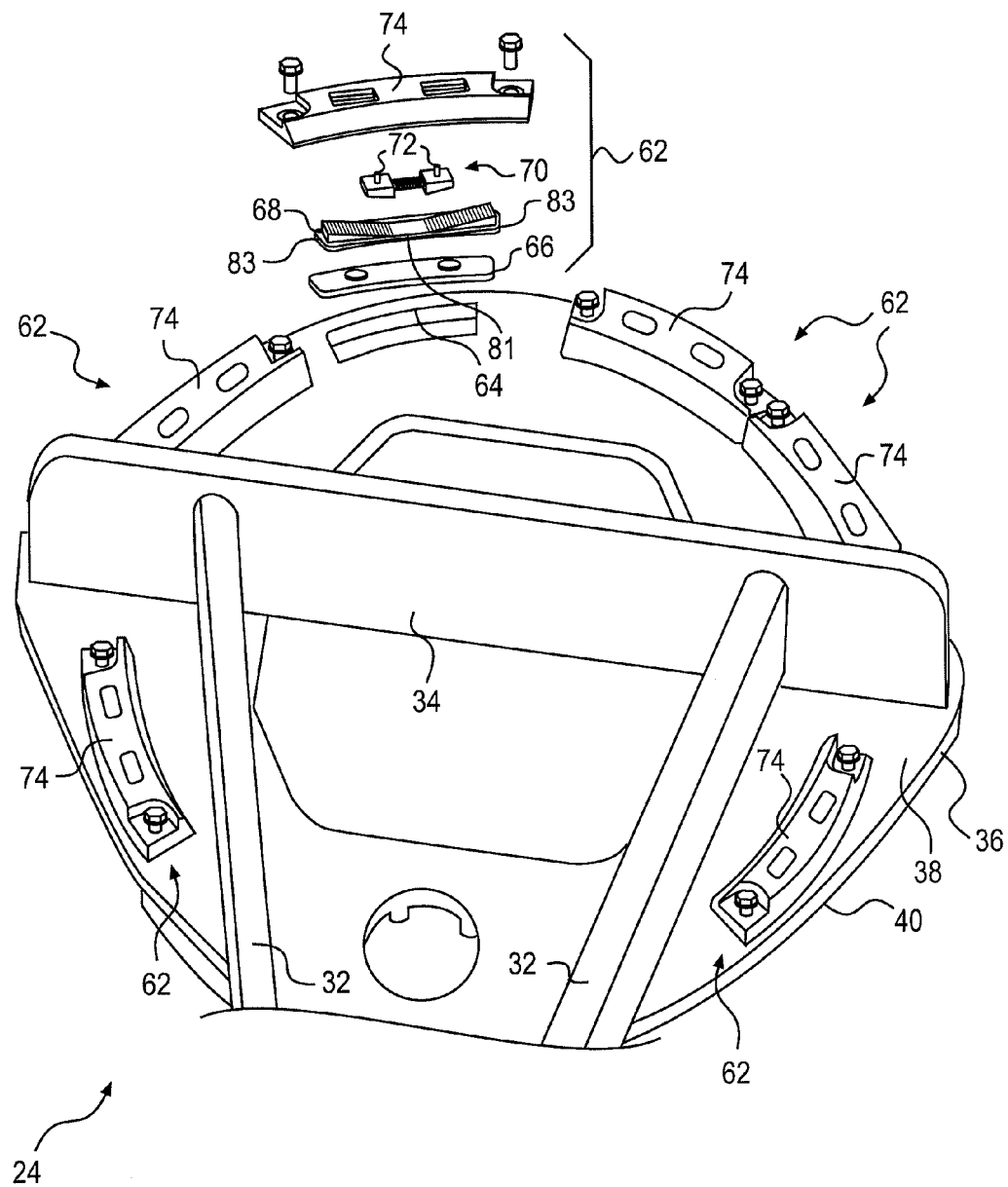
FIG. 3 is a top view pictorial illustration of the drawbar-circle-moldboard of FIG. 2.
Figure 11:
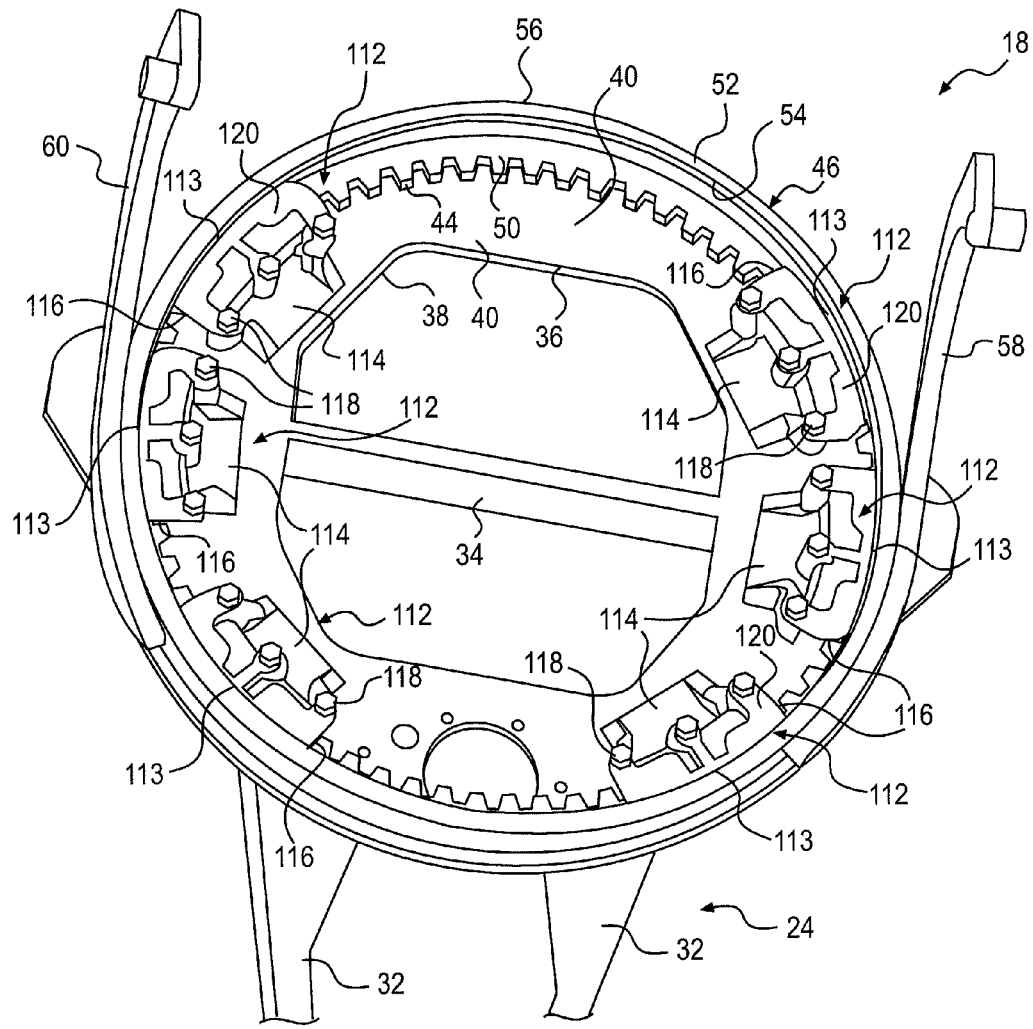
FIG. 11 is a bottom view pictorial illustration of the drawbar-circle-moldboard of FIG. 2.

As will be described in more detail below, circle assembly 26 may be positioned both axially and radially relative to yoke 24 by way of a plurality of adjustable wear assemblies 62, as shown in FIG. 3, and by way of a plurality of circle shoes 112, as shown in FIG. 11. Adjustable wear assemblies 62 may be annularly distributed around an upper periphery of yoke 24 to axially push circle assembly 26 away from yoke 24 and toward circle shoes 112, while circle shoes 112 may be annularly distributed around a lower periphery of yoke 24 to bias circle assembly 26 upward toward yoke 24. In this manner, circle assembly 26 may be effectively sandwiched between adjustable wear assemblies 62 and circle shoes 112 and thereby axially retained in a desired position relative to yoke 24. Circle shoes 112 may also include geometry configured to radially position circle assembly 26 relative to yoke 24 when circle assembly 26 is biased toward circle shoes 112 by adjustable wear assemblies 26.

Figure 4:
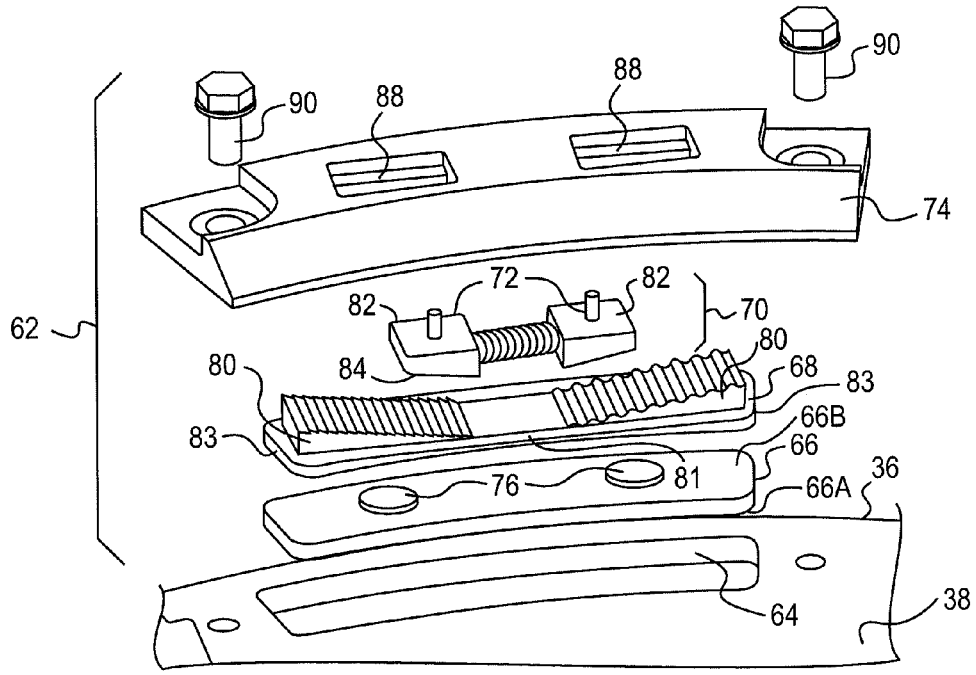
FIG. 4 is an exploded view illustration of an exemplary disclosed adjustable wear assembly that may be used with the drawbar-circle-moldboard of FIGS. 2 and 3.
Figure 5:
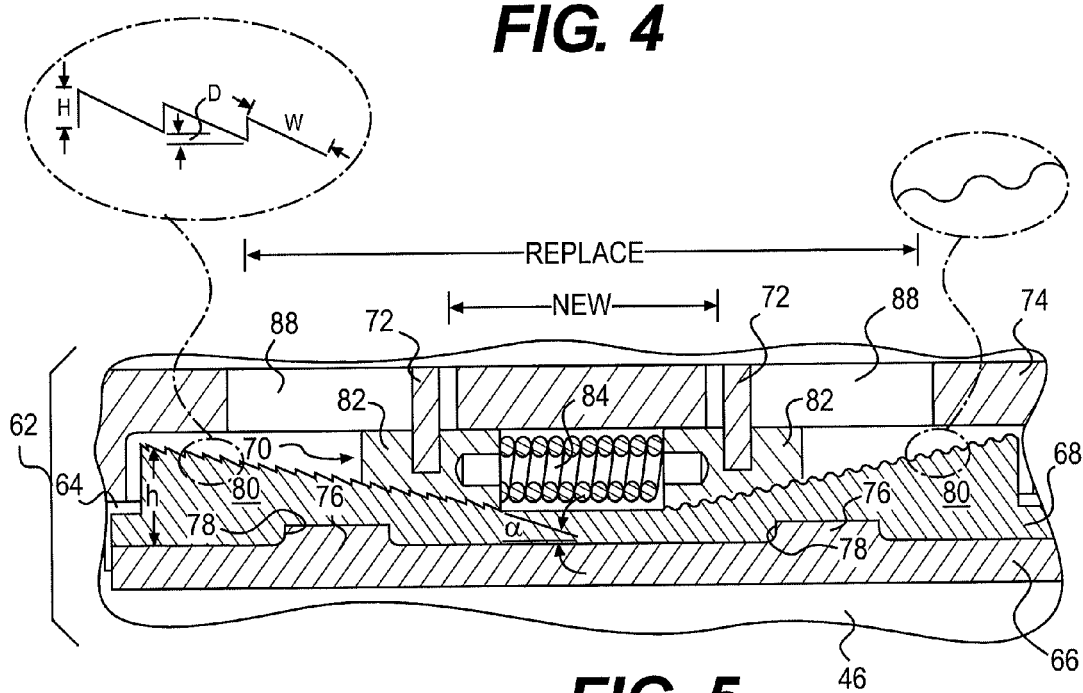
FIG. 5 is a cross-sectional illustration of the adjustable wear assembly of FIG. 4.

As shown in FIG. 3, yoke plate 36 may embody a mounting component configured to receive adjustable wear assemblies 62. Specifically, each of adjustable wear assemblies 62 may be associated with a channel 64 in yoke plate 36 that passes from upper yoke surface 38 through lower yoke surface 40 and, as shown in FIGS. 4 and 5, include a wear insert 66, an inclined adjustment plate 68, a mechanical biasing assembly 70 including a visual wear indicator 72, and a cover 74. Wear insert 66, adjustment plate 68, and mechanical biasing assembly 70 may be disposed within channel 64, and cover 74 may close off a side of channel 64 opposite circle assembly 26.

Wear insert 66 may embody a generally arcuate substrate having a generally planar wear surface 66A and a generally opposing mounting surface 66B. The arc contour of wear insert 66 may substantially match the outer shape of circle member 46 (i.e., an outer radius of wear insert 66 may be about equal to or less than the outer radius of circle member 46). In one example, wear insert 66 may have an arc radius in the range of about 25-40 inches, a length in the range of about 8-16 inches, a width in the range of about 2-4 inches, and a thickness in the range of about 0.25-0.75 inches. Wear surface 66A of wear insert 66 may be fabricated from a material that is softer than a material of yoke plate 36 and circle member 46. For example, wear surface 66A may be fabricated from a non-metallic material such as glass-filled nylon or from a relatively soft metallic material such as brass or bronze, while yoke plate 36 and circle member 46 may be fabricated from steel. Wear insert 66A may be located within a bottom of channel 64 to ride against upper surface 48 of circle member 46. In this manner, the relatively softer wear surface 66A may be utilized as a sacrificial layer that erodes away before damage to yoke plate 36 and/or circle member 46 may occur. It is contemplated that wear insert 66 may be integral with adjustment plate 68, if desired. For example, wear insert 66 could embody a relatively soft material layer deposited on a harder base material of adjustment plate 68.

Wear insert 66 may include interlocking features, for example protrusions 76, that extend from mounting surface 66B to engage and interlock with corresponding features, for example recesses 78, of adjustment plate 68. Alternatively, one or both of wear insert 66 and adjustment plate 68 could includes adhesives, coordinating surface roughness, or other features that interlock wear insert 66 with adjustment plate 68. The interlocking between wear insert 66 and adjustment plate 68 may inhibit wear insert 66 from being pulled out of channel 64 by the relative rotation of circle member 46 when wear insert 66 has been worn thin.

Adjustment plate 68 may be located within channel 64 in contact with mounting surface 66B of wear insert 66 and include two inclined protrusions 80 oriented opposite each other relative to a length-wise mid-portion 81 of adjustment plate 68. In the embodiment of FIGS. 4 and 5, the inclined protrusions 80 may be thinnest at mid-portion 81 and thickest at opposing ends 83 of adjustment plate 68. Protrusions 80 may each have an angle of inclination "α" of about 10-15°, and an end-height "h" of about 10-20 mm. It is contemplated that each of protrusions 80 may have a generally planar or curved inclined contour with a smooth, toothed, and/or undulated outer profile. For example, the left protrusion 80 of FIGS. 4 and 5 is illustrated as having teeth, while the right protrusion 80 is illustrated as having undulations. Both protrusions 80 of a single adjustment plate 68 may normally include similar inclined surfaces, but are shown in FIGS. 4 and 5 with different geometry for illustrative purposes only. In one example, a representative tooth of the inclined surface of protrusions 80 may have a face width "W" of about 5-6 mm and a riser height "H" of about 1 mm, with a vertical distance "D" between tooth troughs of about 1 mm. These tooth dimensions, combined with the inclination angle "α" may provide for a desired step adjustment in wear insert position, as will be described in more detail below. It is contemplated that the outer profile at the inclined contour of protrusions 80 may be continuous or interrupted, with even or uneven spacing between the teeth or undulations, if desired.

Mechanical biasing assembly 70 may include a pair of wedge blocks 82 and a spring 84 located between wedge blocks 82. Each wedge block 82 may have an inclined lower surface that substantially mirrors the inclined upper surface of an associated protrusion 80 of adjustment plate 68. In particular, an inclination angle of wedge block 82 may be about equal to the inclination angle "α", and each wedge block 82 may have either a smooth surface, a toothed surface, or an undulated surface corresponding to its associated protrusion 80. If wedge block 82 includes a toothed inclined surface, the tooth direction of wedge block 82 may be generally opposite the tooth direction of a mating protrusion 80 such that the corresponding teeth of both components may interlock and inhibit wedge block 82 from sliding down the incline of protrusion 80 under the force of gravity and/or a normal force applied by circle member 46 on wear insert 66. In similar manner, the undulations of wedge block 82 may interlock with the corresponding undulations of an associated protrusion 80 to inhibit the downward sliding caused by gravity and/or the normal force.

In the embodiment of FIGS. 4 and 5, spring 84 may be a compression-type coil spring located to bias wedge blocks 82 away from each other and up the inclined surfaces of protrusions 80. It is contemplated that each wedge block 82 may include a retention feature, for example a recess or a pin, that receives and retains an end of spring 84, if desired.

In the embodiment of FIGS. 4 and 5, visual wear indicator 72 may include a pair of pins 86, one of pins 86 extending from a side of each wedge block 82 opposite the inclined surface thereof. Pins 86 may extend up through channels 88 in cover 74 such that ends of pins 86 may be visible when adjustable wear assemblies 62 are fully assembled to yoke plate 36. Pins 86 may move with wedge blocks 82 to provide a visual indication of a thickness of wear insert 66 and/or a need to service or replace wear insert 66. For example, when pins 86 are nearest each other, in the position marked "New" in FIG. 5, wear insert 66 may be at its thickest dimension. In contrast, when pins 86 are furthest from each other, in the position marked "Replace" in FIG. 5, wear insert 66 may be at a thinner dimension that requires servicing. It is contemplated that an outer surface of cover 74 may be marked with indicia relating to a thickness of wear insert 66 or other similar indicia, if desired.

Cover 74 may connect to upper yoke surface 38 of yoke plate 36 to provide a retaining force for each individual adjustable wear assembly 62 and to close of a side of channel 64. Alternatively, a larger cover (not shown) may be configured to provide this retaining force for multiple adjustable wear assembly 62, if desired. Cover 74 may be retained by way of fasteners 90 located at opposing ends of cover 74.

FIGS. 6 and 7 illustrate another embodiment of adjustable wear assembly 62. Similar to the embodiment of FIGS. 4 and 5, the embodiment of FIGS. 6 and 7 may include wear insert 66, adjustment plate 68, wedge blocks 82, cover 74, and spring 84. However, in contrast to the embodiment of FIGS. 4 and 5, spring 84 in the embodiment of FIGS. 6 and 7 may be a torsion spring supported by a center pin 92. A disk 94 (shown only in FIG. 6 for clarity) may be connected to one end of pin 92 to rotate with pin 92, and spring 84 may connect disk 94 to cover 74 to rotationally bias disk 94 and connected pin 92 relative to cover 74. Adjustable wear assembly 62, in the embodiment of FIGS. 6 and 7, may also include two lever arms 96, each hinged at one end to an associated wedge block 82 and at another end to opposing edges of disk 94. Lever arms 96 may be free to translate and thereby move wedge blocks 82 away from each other and up the inclined surfaces of protrusions 80, as spring 84 rotates disk 94.

The adjustable wear assembly 62 of FIGS. 6 and 7, may include a visual wear indicator 95 different than visual wear indicator 72 of FIGS. 4 and 5. Visual wear indicator 95 may include a reference feature, for example a recess 97, located at an edge in an exposed surface of disk 94, and radially-oriented indicia on cover 74. Recess 97 may rotate with disk 94 to provide a visual indication of a thickness of wear insert 66 and/or a need to service or replace wear insert 66. For example, when recess 97 is oriented at a first position marked "New", wear insert 66 may be at its thickest dimension. In contrast, when recess 97 is rotated clockwise to a second position marked "Replace", wear insert 66 may be at a thinner dimension that requires servicing.

Figure 8:
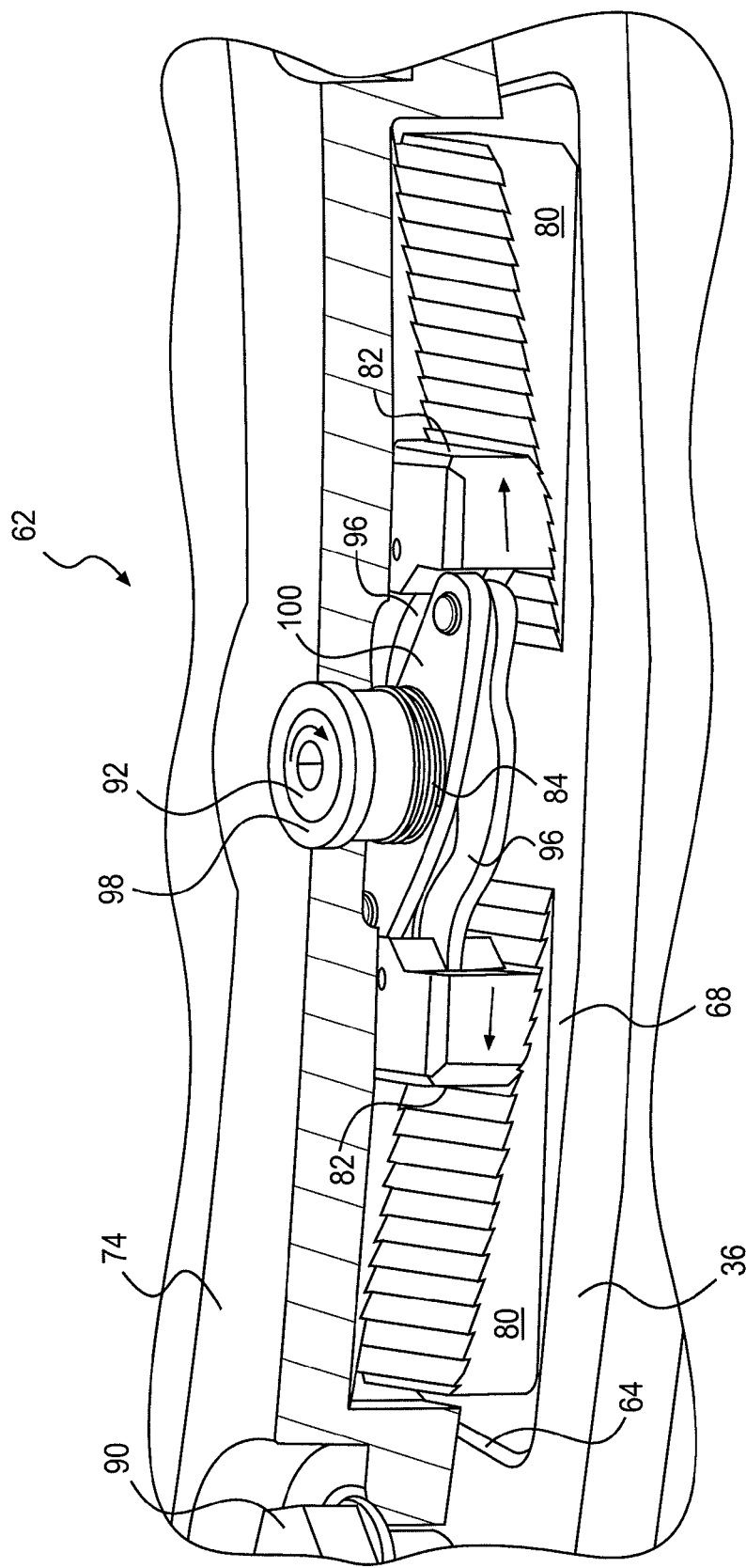
FIG. 8 is a cross-sectional illustration of another exemplary disclosed adjustable wear assembly that may be utilized with the drawbar-circle-moldboard of FIGS. 2 and 3.

FIG. 8 illustrates another embodiment of adjustable wear assembly 62. Similar to the embodiment of FIGS. 6 and 7, the embodiment of FIG. 8 includes wear insert 66 (not shown in FIG. 8), adjustment plate 68, wedge blocks 82, cover 74, spring 84, lever arms 96, and pin 92. However, in contrast to the embodiment of FIGS. 6 and 7, disk 94 may be replaced with a link 100 that is connected at its center to pin 92 and at its ends to lever arms 96. In addition, spring 84 in the embodiment of FIG. 7 may be supported by a stationary bushing 98 that surrounds center pin 92, and spring 84 may connect link 100 to cover 74 to rotationally bias link 100 and connected pin 92 relative to cover 74 and bushing 98. In this arrangement, lever arms 96 may be free to translate and move wedge blocks 82 away from each other and up the inclined surfaces of protrusions 80, as spring 84 rotates link 100 and pin 92 relative to bushing 98.

Figure 9:
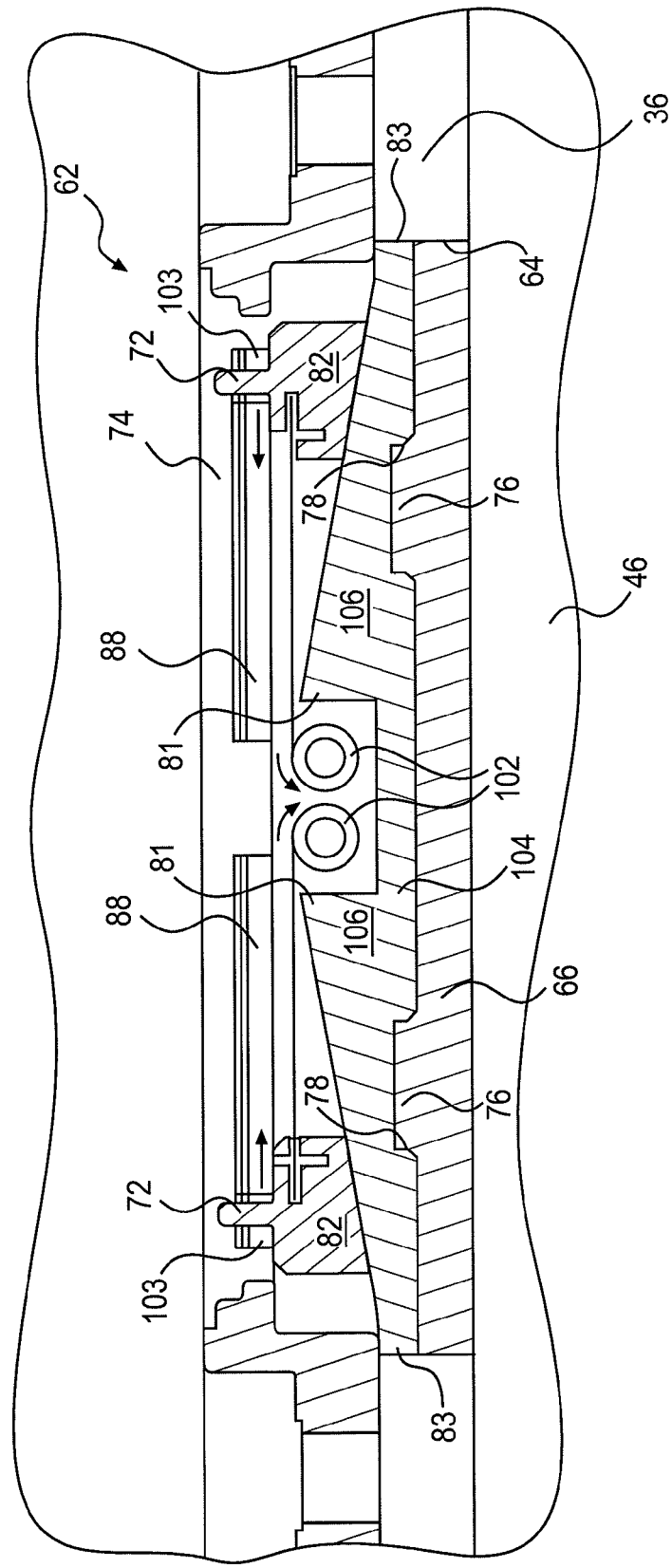
FIG. 9 is a cross-sectional illustration of another exemplary disclosed adjustable wear assembly that may be utilized with the drawbar-circle-moldboard of FIGS. 2 and 3.

FIG. 9 illustrates another embodiment of adjustable wear assembly 62. Similar to the embodiment of FIGS. 5 and 6, the embodiment of FIG. 9 includes wear insert 66, wedge blocks 82, and cover 74. However, in contrast to the embodiment of FIGS. 4 and 5, spring 84 in the embodiment of FIG. 9 may be replaced by a pair of constant force extension springs 102, each connected to one of wedge blocks 82 to pull wedge blocks 82 inward toward each other. In addition, adjustment plate 68 may be replaced with an adjustment plate 104 having protrusions 106 with inclines that are thinnest at ends 83 of adjustment plate 104 and thickest at mid-portion 81 of adjustment plate 10. In this configuration, wedge blocks 82 may be moved up the inclined surfaces of adjustment plate 68 as wedge blocks 82 are pulled together by springs 102.

In one embodiment, notches 103 may be associated with channels 88 in cover 74 to facilitate construction of adjustable wear assembly 62 of FIG. 9. That is, to construct adjustable wear assembly 62, wedge blocks 82 may be pulled apart to set spring 84 at a desired tension, and visual wear indicator 72 engaged with notches 103 of cover 74 to maintain the tension of spring 84 until adjustable wear assembly 62 can be placed into channel 64 and cover 74 can be fastened to yoke plate 36 to close off channel 64. Thereafter, visual wear indicator 72 may be moved out of notches 103 to allow spring 84 to pull wedge blocks 82 toward each other and thereby bias adjustment plate 66 downward toward circle member 46. It is contemplated that similar geometry may be associated with other embodiments of adjustable wear assembly 62 to facilitate construction thereof, if desired.

Figure 10:
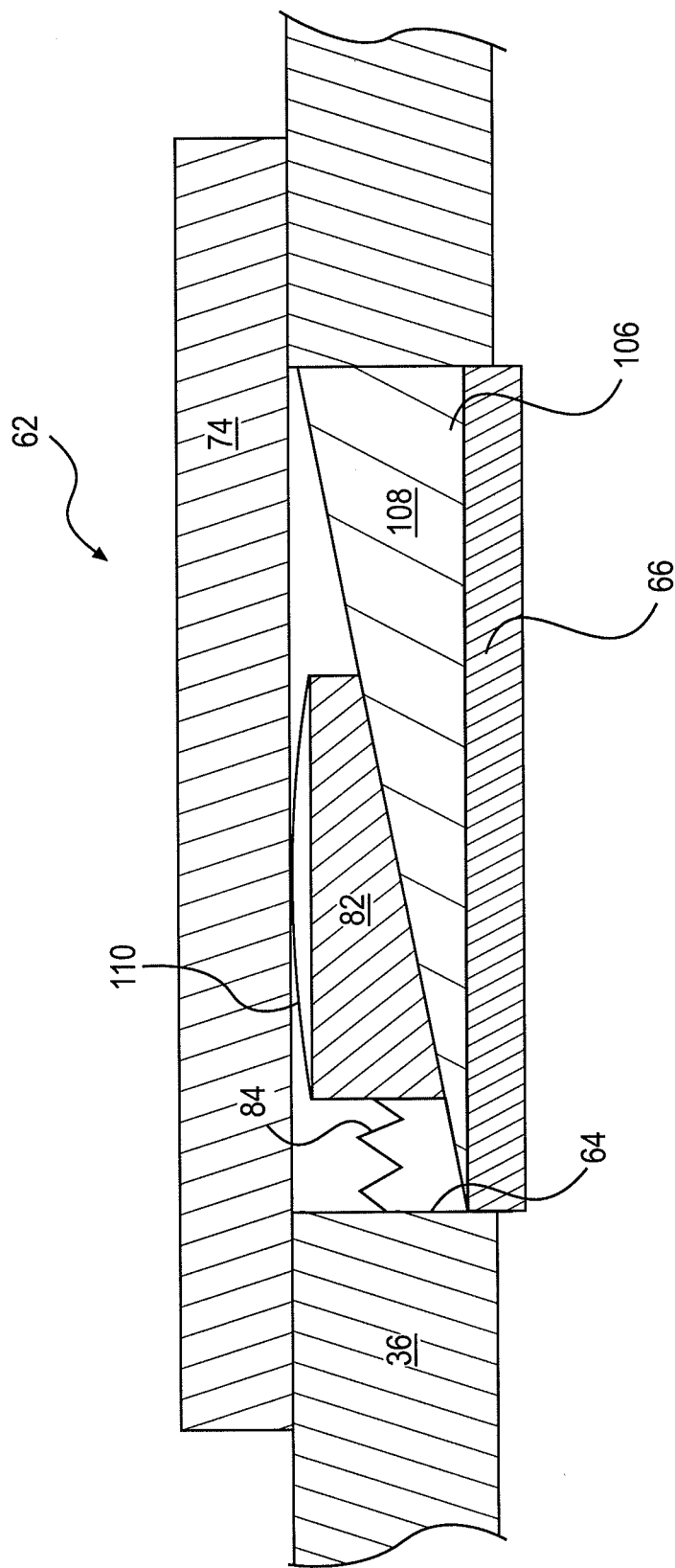
FIG. 10 is a simplified cross-sectional illustration of another exemplary disclosed adjustable wear assembly that may be utilized with the drawbar-circle-moldboard of FIGS. 2 and 3.

FIG. 10 illustrates another embodiment of adjustable wear assembly 62. Similar to the embodiment of FIGS. 4 and 5, adjustable wear assembly 62 of FIG. 10 may include wear insert 66, cover 74, and spring 84. However, in contrast to the embodiment of FIGS. 4 and 5, adjustable wear assembly 62 of FIG. 10 may include only a single wedge block 82, and spring 84 may be located between a wall of channel 64 and the one wedge block 82 to bias the one wedge block 82 toward an adjustment plate 104 having only a single inclined protrusion 108. Although adjustable wear assembly 62 may have any type of inclined interface between adjustment plate 104 and wedge block 82, in the embodiment of FIG. 10, adjustable wear assembly 62 is shown with a smooth interface. And, absent the toothed or undulated geometry, adjustment plate 104 may be provided with a leaf spring 110 located between wedge block 82 and cover 74. Leaf spring 110 may provide functionality similar to that provided by the toothed or undulated interface, by inhibiting excessive and/or undesired movement of wedge block 82.

As described above, adjustable wear assemblies 62 may bias circle member 46 downward away from yoke 24 and thereby axially position circle member 46 against circle shoes 112. The downward bias of adjustable wear assemblies 62, in conjunction with the force of gravity acting on circle member 46, may coordinate with geometry of circle shoes 112 to also radially position circle member 46 relative to yoke 24, while still allowing circle assembly 26 to rotate relative to yoke 24.

Figure 12:
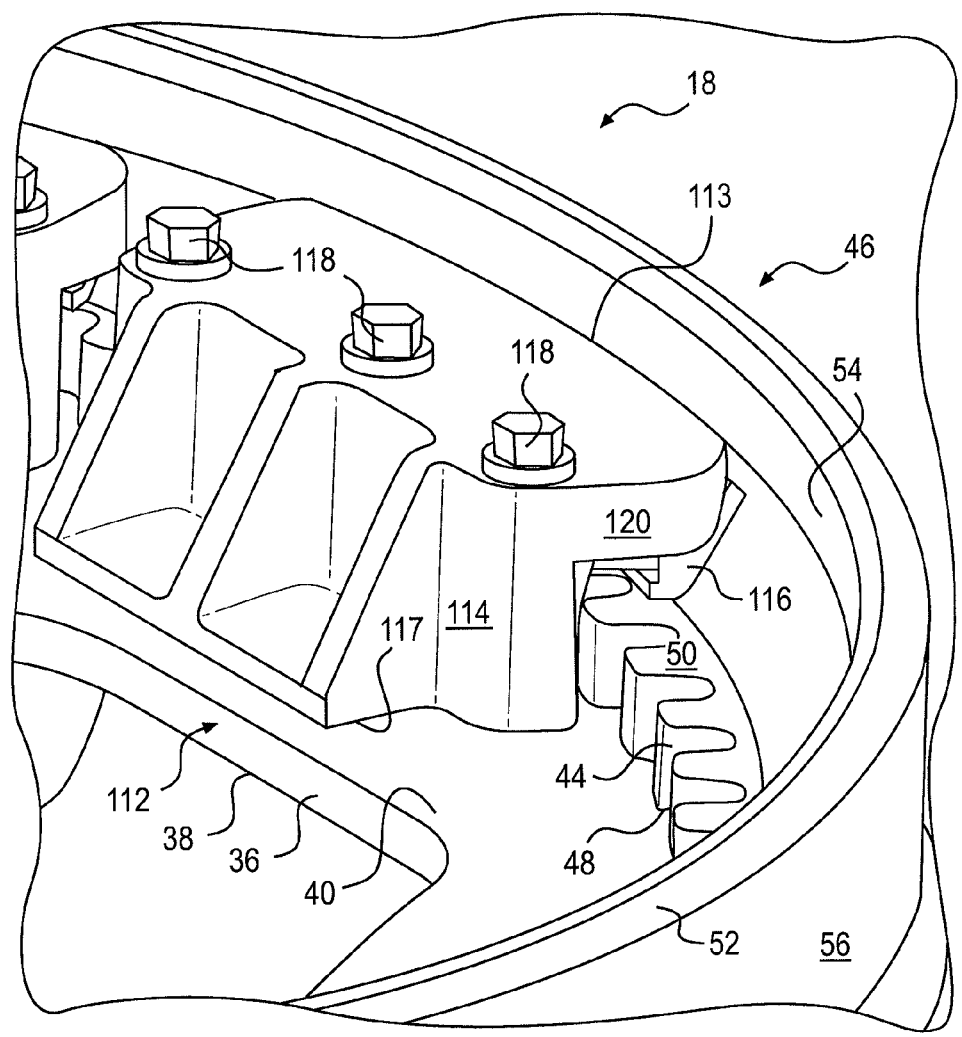
FIG. 12 is a pictorial illustration of an exemplary disclosed circle shoe that may be used with the drawbar-circle-moldboard of FIGS. 2 and 11.

FIGS. 11 and 12 illustrate each circle shoe 112 as having a base portion 114, a lip portion 120 protruding from base portion 114, and a wear insert 116 operatively connected to lip portion 120. Base portion 114 may have a mounting surface 117 (not shown in FIG. 11) connected to lower yoke surface 40 of yoke plate 36 by way of, for example, welding or a plurality of fasteners 118. It is contemplated that one or both of base portion 114 and yoke plate 36 may include oversized holes or slots 115 (shown in FIGS. 16-22) configured to receive fasteners 118 such that some radial adjustments to circle shoe 112 may be made, if desired. Lip portion 120 may extend from base portion 114 in a direction generally parallel to yoke plate 36 to engage lower surface 50 of circle member 46 and thereby axially and radially support circle member 46 relative to yoke plate 36. In one example, base portion 114 and lip portion 120 may form a single integral component. In another example, as will be described in more detail below, lip portion 120 may be a component separate from base portion 114 and connected to base portion 114 by way of, for example, a hinge. Wear insert 116 may be positioned between lip portion 120 and circle member 46 to act as a sacrificial layer and thereby reduce wear of lip portion 120 and circle member 46.

Figure 13:
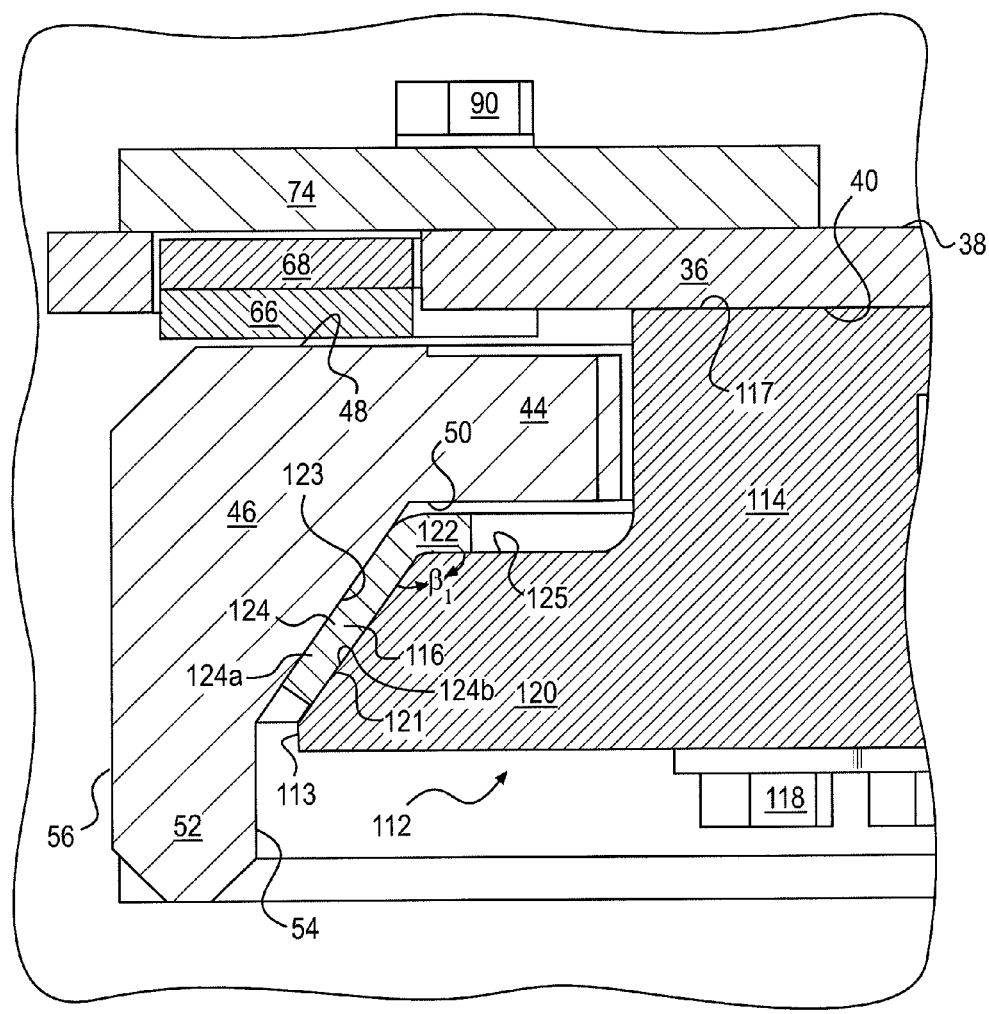
FIG. 13 is an end-view cross-sectional illustration of the circle shoe of FIG. 12.

FIG. 13 illustrates an end view of an exemplary circle shoe embodiment, where lip portion 120 includes a bevel 121 at an inside corner of the outer curved edge 113 of circle shoe 112. In one embodiment, bevel 121 may be located at an oblique angle relative to the mounting surface of base portion 114, and have an internal bevel angle "$\beta_1$" of about 100-170°, and more specifically about 135°. In this embodiment, circle member 46 may have a similar bevel 123 connecting lower surface 50 to inner annular surface 54 of rim 52, with wear insert 116 being located at least partially between bevels 121 and 123. In this manner, bevel 121 of circle shoe 112 may press against bevel 123 of circle member 46 via wear insert 116 to create an upward force and an outward force in all directions against circle member 46, thereby axially and radially positioning circle member 46. Although lip portion 120 is shown in the exemplary embodiment of FIG. 13 as including bevel 121 that substantially matches bevel 123 of circle member 46, it is contemplated that lip portion 120 may alternatively have geometry other than a bevel and be configured only for mounting of wear insert 116, if desired. In this alternative embodiment, wear insert 116 may include inner surface geometry necessary for mounting to lip portion 120, and outer surface geometry, for example a bevel, that corresponds with and engages bevel 123 of circle member 46.

Wear insert 116 may be fabricated from a material that is softer than a material of circle shoe 112 and circle member 46, and located on lip portion 120 to ride against circle member 46. For example, wear insert 116 may be fabricated from a non-metallic substrate such as glass-filled nylon or from a soft metallic substrate such as brass or bronze, while circle shoe 112 and circle member 46 may be fabricated from steel. In this manner, wear insert 116 may be utilized as a sacrificial layer to erode away before damage to circle shoe 112 and/or circle member 46 may occur. As will be described in more detail below, wear insert 116 may include features that engage and lock together with features of lip portion 120. The interlock between wear insert 116 and lip portion 120 may inhibit wear insert 116 from being moved out of position by the rotation of circle member 46.

In the embodiment of FIG. 13, wear insert 116 may include an arcuate and generally planar first portion 122 and a curved and generally non-planar second portion 124 connected at an oblique angle to first portion 122. The arc radius of first portion 122 and the curvature of second portion 124 may generally match the curvature of outer curved edge 113 of circle shoe 112, while the angle between outer surfaces of first and second portions 122, 124 may generally match the angle "$\beta_1$" of bevel 121. In one example, the arc radius of first portion 122 and the curvature of second portion 124 may be in the range of about 25-40 inches. Wear insert 116 may have a length in the range of about 8-16 inches, a width in the range of about 2-4 inches, and a thickness in the range of about 0.125-0.5 inches. This configuration may provide both a sacrificial layer between bevels 121 and 123 of circle shoe 112 and lip portion 120, and a sacrificial layer between an inner planar surface 125 of lip portion 120 and lower surface 50 of circle member 46. Although an outer surface 124a and an inner surface 124b of second portion 124 are illustrated in FIG. 13 as being generally parallel, it is contemplated that the outer and inner surfaces may alternatively be non-parallel, if desired. That is, a bevel angle at the outer surface of 124a relative to first portion 122 may be different than a bevel angle at inner surface 124b, if desired.

Figure 14:
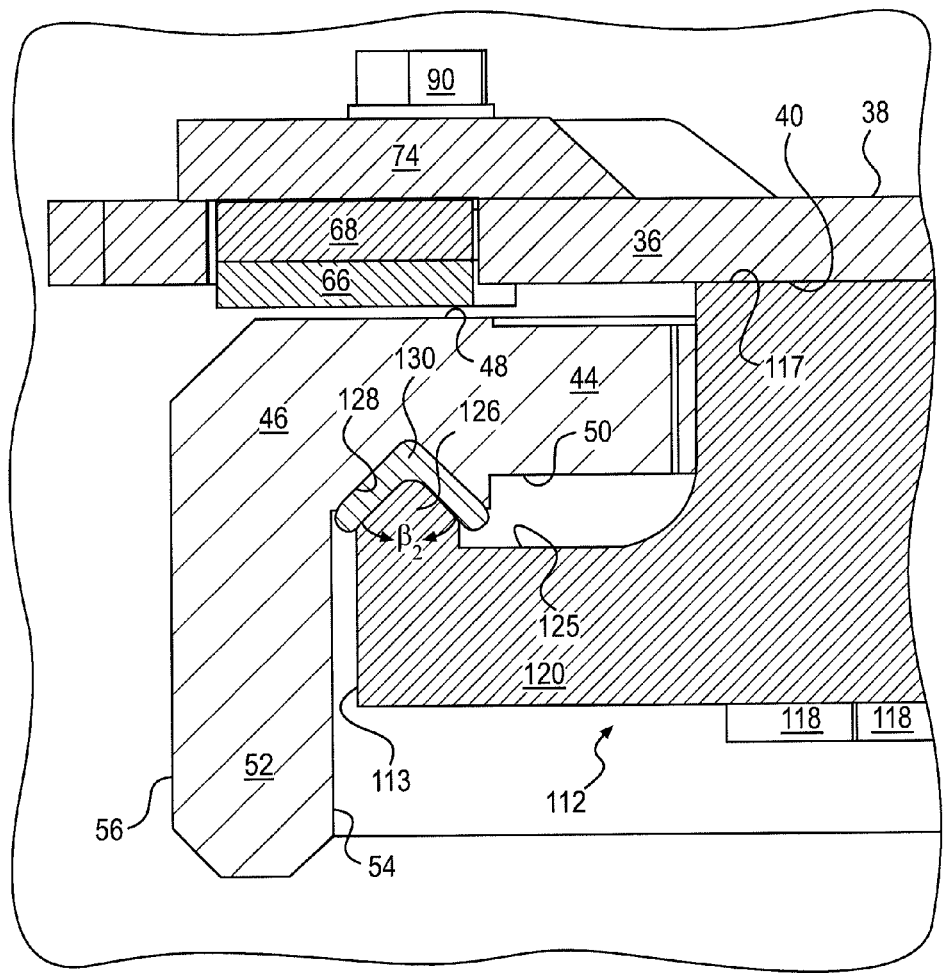
FIG. 14 is an end-view cross-sectional illustration of another exemplary disclosed circle shoe that may be used with the drawbar-circle-moldboard of FIGS. 2 and 11.

FIG. 14 illustrates another embodiment of circle shoe 112, where lip portion 120 includes a V-shaped projection 126 extending from inner planner surface 125 at outer curved edge 113 of lip portion 120 toward yoke plate 36. Opposing wear surfaces of V-shaped projection 126 may both be located at oblique angles relative to mounting surface 117 of base portion 114 and yoke plate 36. For example, an internal angle "$\beta_2$" of V-shaped projection 126 may be in the range of about 65-125°, and more specifically about 90°, at a tip portion thereof (i.e., the wear surfaces of V-shaped projection 126 may be oriented at about 45° to lower yoke surface 40 of yoke plate 36).

In the embodiment of FIG. 14, circle member 46 may have a similar inverted V-shaped recess 128 annularly-located around a periphery of lower surface 50, with a V-shaped wear insert 130 located at least partially between V-shaped projection 126 and internal walls of V-shaped recess 128. Because of the annular shape of recess 128, the opposing surfaces of both V-shaped projection 126 and V-shaped recess 128 may be generally non-planar and the vertexes thereof arcuate along their length. In this manner, V-shaped projection 126 of circle shoe 112 may press against the internal walls of V-shaped recess 128 of circle member 46 via wear insert 130 to create an upward force and radially-equalizing forces (i.e., both radially-inward and radially-outward forces) around an entire periphery of circle member 46, thereby axially and radially positioning circle member 46 relative to yoke 24.

Figure 15:
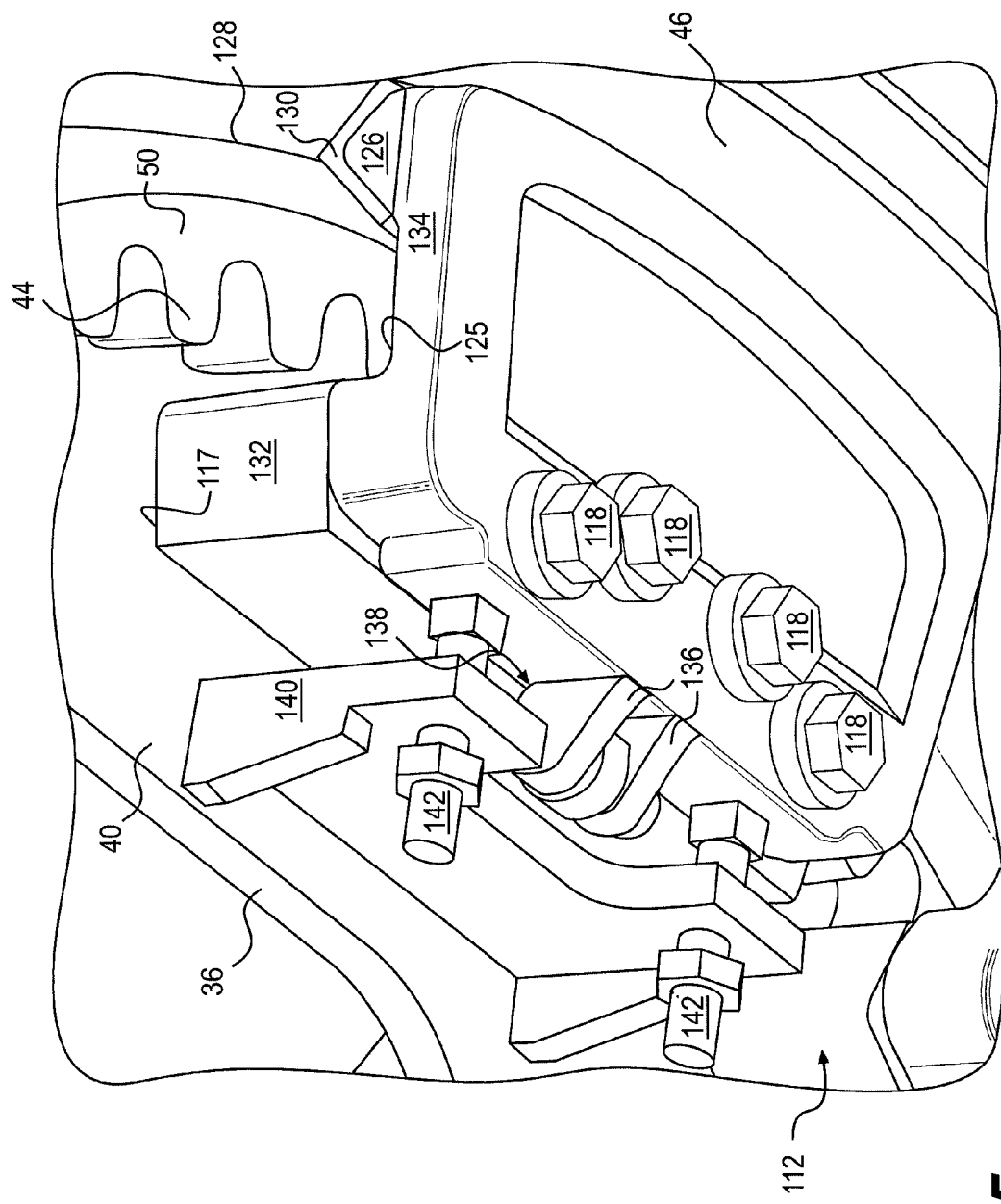
FIG. 15 is pictorial illustration of another exemplary disclosed circle shoe that may be used with the drawbar-circle-moldboard of FIGS. 2 and 11.
Figure 19:
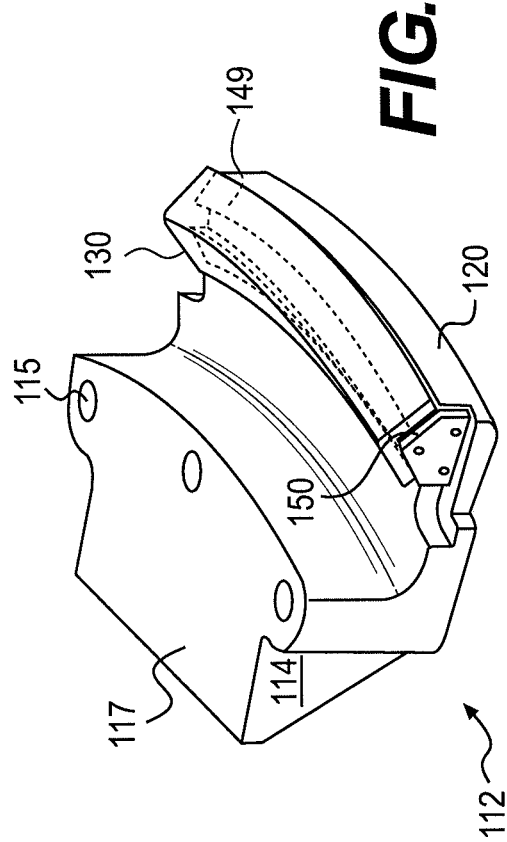
Figure 20:
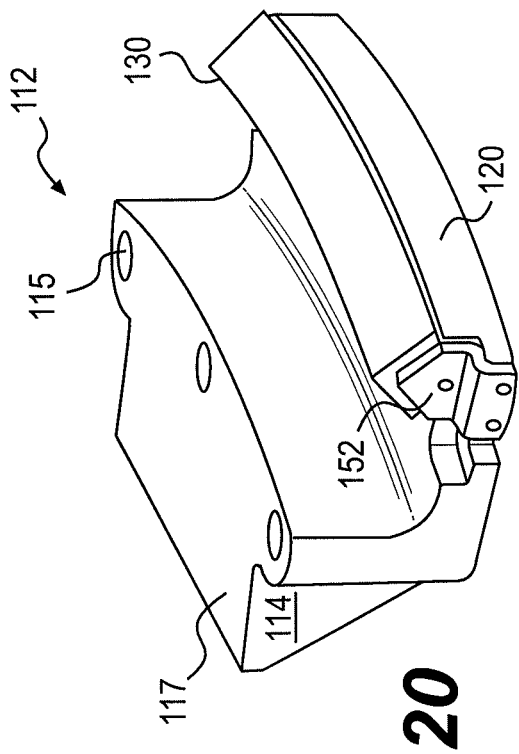

FIG. 15 illustrates another embodiment of circle shoe 112. In this embodiment, a base portion 132 may be welded to yoke plate 36, and an associated lip portion 134 may be separate from and bolted to base portion 132. Lip portion 134 may additionally include a hinge portion 136 configured to loosely engage, at a joint 138, a hinge base 140 that may also be welded to yoke plate 36. The loose engagement at joint 138, in conjunction with the oversized holes or slots 115 (referring to FIGS. 16-22) may provide for an initial radial adjustment of lip portion 134 via one or more adjustment screws 142. It is contemplated that base portion 132 and/or hinge base 140 may alternatively be an integral component and/or connected to yoke plate 36 in a manner other than welding, if desired.

FIGS. 16-20 illustrate different wear insert configurations that may be utilized with the circle shoes of FIGS. 14-15. As can be seen from these figures, V-shaped projection 126 of lip portions 120, 134 may include one or more open-ended channels 144 (FIG. 16) that extend along a length direction of V-shaped projection 126; one or more interruptions 146 (FIG. 17) located along the length of V-shaped projection 126; and/or one or more recesses 148 (FIG. 18) that extend along the length direction of V-shaped projection 126. In these examples, wear insert 130 may have corresponding projections 149 (FIG. 16) configured to engage the channels, interruptions, and/or recesses such that movement of wear insert 130 may be inhibited relative to lip portions 120, 134. Alternatively, wear insert 130 may include the channels, interruptions, and/or recesses, while lip portions 120, 134 may include the projections, if desired. In addition or alternatively, a generally planar bracket 150 (FIG. 19) or a stepped bracket 152 (FIG. 20) may be located at one or both ends of wear insert 130 to engage lip portion 120, 134 and thereby inhibit relative movement between wear insert 130 and lip portion 120, 134. In yet another example, wear insert 130 may include an integral flange-like projection 154 (FIG. 16) at one or both ends thereof that performs a function similar to brackets 150, 152, if desired.

FIGS. 21 and 22 likewise illustrate different wear insert configurations. For example, FIG. 21 illustrates circle shoe 112 of the embodiment of FIGS. 12 and 13 as having an interruption or recess 156 within bevel 123 that is configured to engage a corresponding projection of wear insert 116. In addition, wear insert 116 illustrated in FIG. 22 is shown as having flanged portions 158 that engage with recesses 160 located at opposing ends of lip portion 120.

It is contemplated that wear inserts 116, 130 may alternatively or additionally be retained in position relative to lip portions 120, 134 in a manner other than by interlocking geometry. For example, wear inserts 116, 130 may alternatively or additionally be adhesively joined to lip portions 120, 134 or integrally formed with lip portions 120, 134 through molding or deposition process, if desired.

Industrial Applicability

The disclosed adjustable wear assemblies and circle shoes may be used with any machine having a drawbar-circle-moldboard (DCM) to axially and radially position the DCM. In particular, the adjustable wear assemblies may provide for automatic vertical adjustments that bias an associated circle member downward toward the circle shoes as associated wear inserts erode. The downward force of the adjustable wear assemblies may, in turn, cause angled surfaces of the circle member to engage and slide against beveled geometry of the circle shoes. The engagement of the circle member with the beveled geometry of the circle shoes may result in evenly distributed outward forces that radially position the circle member. The disclosed adjustable wear assemblies and circle shoes may provide simple, low-cost structures and methods for improving DCM placement accuracy and repeatability, while reducing maintenance time associated with wear insert adjustment.

As described above, wear inserts 66 may erode over time because of relative movement between the mating surfaces of circle member 46 and drawbar yoke 24. As wear inserts 66 erode, a clearance around circle member 46 may increase. If left unchecked, this increased clearance could result in less rigidity in the connection between circle member 46 and yoke 24.

The increased clearance may be addressed in at least two ways. If the wear on a particular wear insert 66 is severe enough (i.e., if the thickness of the particular wear insert 66 is less than a predetermined value), wear insert 66 may be replaced. Otherwise, if the wear on a particular wear insert 66 is less severe, but the clearance around circle member 46 is unacceptable, a position of adjustment plate 68, 102 may be adjusted to reduce the clearance and increase a clamping force on circle member 46 provided by wear inserts 66.

Historically, either of the two above-described maintenance activities required that the entire drawbar-circle-moldboard assembly be disassembled. The circle member had to be removed from the drawbar yoke member because the drawbar wear inserts and associated shims were disposed between the circle member and drawbar yoke member and were accessible only from a lower surface of the drawbar yoke member. Thus, it was necessary to remove the circle member to access the drawbar wear inserts and associated shims.

In the disclosed assembly, as described above, wear inserts 66 may be disposed within channels 64 that may be accessible from upper yoke surface 38 of yoke plate 36. Circle member 46 need not be removed from yoke 24 to provide access to wear inserts 66. Instead, access to wear inserts 66 may be gained from upper yoke surface 38 of yoke plate 36. The method of replacing wear inserts 66 may simply include removing cover 74, replacing wear inserts 66, and replacing cover 74. Circle member 46 may remain connected to yoke 24 during maintenance of wear inserts 66, thereby reducing the difficulty and time associated with the maintenance process.

The operation of adjustable wear assembly 62 may be automatic, without any manual involvement required. A first example of this operation will be provided with reference to FIG. 5. As can be seen from FIG. 5, as any one of wear inserts 66 116, 130 becomes thinner, adjustment plate 68 may move lower within channel 64 toward circle shoes 112. When adjustment plate 68 moves lower within channel 64, a space may be created toward the top side of channel 64, between adjustment plate 68 and cover 74. This space may eventually become large enough for wedge blocks 82 to be moved outward, by the bias of spring 84, away from each other and up the toothed or undulated steps of inclined protrusions 80. The outward movement of wedge blocks 82 may consume the space created by the lowering of adjustment plate 68. As wedge blocks 82 move outward, the toothed or undulated interface between wedge blocks 82 and inclined protrusions 80 may inhibit movement of wedge blocks 82 back down the slop of inclined protrusions 80. In addition, the toothed or undulated interfaces may provide for discrete step-wise adjustments to the position of wear insert 66.

Adjustable wear assembly 62, in the embodiment of FIG. 6, may operate in a manner similar to that described above with regard to the embodiment of FIG. 5. That is, as any one of wear inserts 66, 116, 130 becomes thinner over time and adjustment plate 68 moves lower within channel 64, the space toward the top of channel 64 may increase. And, as this space increases, disk 94 may be rotated by spring 84 to move wedge blocks 82 outward and up the slopes of inclined protrusions 80 via lever arms 96, thereby re-establishing the desired rigidity between yoke 24 and circle member 46. Adjustable wear assembly 62 in the embodiment of FIG. 8 may operate similarly when necessary, by rotating bushing 98 to causes lever arms 96 to move wedge blocks 82 away from each other and up the slopes of inclined protrusions 80.

In contrast to the previously described embodiments, wedge blocks 82 of adjustable wear assembly 62 shown in FIG. 9 may be urged inward when any one of wear inserts 66, 116, 130 has eroded substantially. That is, as the space toward the top side of channel 64 becomes larger, the bias exerted by constant force extension springs 102 may draw wedge blocks 82 toward each other and up the slopes of inclined protrusions 104. As wedge blocks 82 move toward each other, the space at the top of channel 64 may be consumed by wedge blocks 82 and the desired rigidity between yoke 24 and circle member 46 may be re-established.

The wear adjustment assembly 62 of FIG. 10 may function in a manner similar to that of FIG. 5. That is, as any one of wear inserts 66, 116, 130 wears and adjustment plate 68 moves lower to create the space at the top of channel 64, spring 84 may bias wedge block 82 up the slope of inclined protrusion 108 to consume the space and re-establish the proper rigidity between yoke 24 and circle member 46. However, in contrast to the embodiment of FIG. 5, wear adjustment assembly 62 of FIG. 10 may include a smooth interface between wedge block 82 and inclined protrusion 108. The smooth interface may provide for variable and infinite adjustment of the wear insert position. To accommodate the smooth interface, wedge block 82 may be provided with leaf spring 110 that helps to inhibit undesired movements of wedge block 82.

Wear inserts 116, 130 of circle shoes 112 may also require periodic maintenance. Wear inserts 116, 130 may be replaced in at least two different ways, depending on whether the corresponding base and lip portions are separate components or integral. For example, in the embodiment of FIG. 12, base portion 114 and lip portion 120 may be integral and, to replace wear inserts 116, 130, circle shoe 112 may be completely removed from lower yoke surface 40 of yoke plate 36. For a given DCM 18, less than all of the corresponding circle shoes 112 may be moved at one time, such that circle member 46 may remain in place relative to yoke 24 during servicing (i.e., one circle shoe 112 may be serviced at a time). After removal of circle shoe 112, wear inserts 116, 130 can be removed from the appropriate recesses, interruptions, and/or channels within lip portion 120. In some instances, one or more fasteners may need to be loosened and/or removed from brackets and/or flanges located at ends of wear inserts 116, 130, to facilitate removal and replacement of wear inserts 116, 130.

In the embodiment of FIG. 15, where lip portion 134 may be separate from base portion 132, replacement of wear inserts 116, 130 may not require complete removal of base portion 132 from lower yoke surface 40 of yoke plate 36. That is, fasteners 118 holding lip portion 134 in position relative to base portion 132 may be removed, and lip portion 134 may be pivoted about hinge joint 138 away from base portion 132. After the pivoting away of lip portion 134, wear inserts 116, 130 can be removed from the appropriate recesses, interruptions, and/or channels within lip portion 120, and then replaced.

Historically, circle shoe adjustment service was required to maintain a desired yoke/circle member radial relationship. That is, as conventional circle shoe wear inserts eroded, even by small degrees that did not yet require replacement, the conventional circle shoes required manual adjustment to maintain an appropriate radial rigidity between the yoke and circle member. In order to perform this adjustment, either insertion of supplemental shims into the circle shoes or physical re-positioning of the entire circle shoe itself was performed.

In the disclosed assembly, however, the radial rigidity between yoke 24 and circle member 46 may be maintained without any manual intervention. That is, wear inserts 116, 130, because of their angular configurations, when engaged by the mating angular geometry of circle member 46 (i.e., when engaged by bevel 123 or V-shaped groove 128), may exert evenly distributed normal forces on circle member 46 in a radially-outward direction. These normal forces may naturally maintain circle member 46 at a desired radial position relative to yoke 24 as wear inserts 116, 130 erode. For example, as circle member 46 rotates relative to yoke 24, wear inserts 116, 130 may erode and become thinner, leaving additional radial and axial clearances between lower surface 50 of circle member 46 and lip portion 120 of circle shoe 112. Once the additional clearances are created, circle member 46 may be pulled downward by gravity until the beveled surfaces of circle member 46 re-engage the worn and angled wear inserts 116, 130 and thereby consume the radial clearance. Thereafter, adjustable wear assemblies 62 may ratchet wear insert 66 and adjustment plate 68 downward on top of circle member 46 to consume the axial clearance and retain circle member 46 in its new position. Consequently, the beveled interface between circle member 46 and the outer surface of wear inserts 116, 130 may still maintain the desired axial and radial position and rigidity between circle member 46 and yoke 24 even when wear inserts 116 and 120 have eroded, without any manual servicing of wear inserts 116, 120 required.

It will be apparent to those skilled in the art that various modifications and variations can be made to the adjustable wear assembly of the present disclosure without departing from the scope of the disclosure. Other embodiments will be apparent to those skilled in the art from consideration of the specification and practice of the adjustable wear assembly disclosed herein. It is intended that the specification and examples be considered as exemplary only, with a true scope of the disclosure being indicated by the following claims and their equivalent.

What is claimed is:

1. An adjustable wear assembly for use with a mounting component of a drawbar-circle-moldboard having a channel, comprising:
 a wear insert located within the channel;
 an inclined adjustment plate located within the channel in contact with the wear insert;
 at least one wedge block located within the channel in contact with the inclined adjustment plate; and
 a cover connectable to the mounting component to close off a side of the channel.

2. The adjustable wear assembly of claim 1, wherein the wear insert is fabricated from a material softer than the mounting component.

3. The adjustable wear assembly of claim 1, wherein:
 the inclined adjustment plate includes an interlocking feature; and
 the wear insert includes a corresponding interlocking feature configured to engage the interlocking feature of the inclined adjustment plate.

4. The adjustable wear assembly of claim 1, wherein the inclined adjustment plate includes at least one of teeth and undulations that engage the at least one wedge block.

5. The adjustable wear assembly of claim 1, further including a visual wear indicator associated with the at least one wedge block.

6. The adjustable wear assembly of claim 5, wherein:
 the cover includes at least one channel; and
 the visual wear indicator includes a pin extending from the at least one wedge block through the at least one channel of the cover.

7. The adjustable wear assembly of claim 1, wherein the inclined adjustment plate includes a first inclined protrusion and a second inclined protrusion, the first inclined protrusion being oriented opposite the second inclined protrusion relative to a length-wise midpoint of the inclined adjustment plate.

8. The adjustable wear assembly of claim 7, wherein the at least one wedge block includes a first wedge block associated with the first inclined protrusion and a second wedge block associated with the second inclined protrusion and spaced apart from the first wedge block.

9. The adjustable wear assembly of claim 8, further including at least one spring located between the first and second wedge blocks to urge the first and second wedge blocks up the first and second inclined protrusions and away from the wear insert.

10. The adjustable wear assembly of claim 9, wherein the at least one spring is a compression-type coil spring configured to urge the first and second wedge blocks away from each other.

11. The adjustable wear assembly of claim 9, further including:
 a pin supporting the at least one spring;
 a disk connected to an end of the pin to rotate with the pin;
 a first lever arm connected to the first wedge block and a first edge of the disk; and
 a second lever arm connected to the second wedge block and a second opposing edge of the disk,
 wherein the at least one spring is a torsion spring connecting the cover to the disk.

12. The adjustable wear assembly of claim 9, further including:
 a pin;
 a bushing that slidingly receives the pin and supports the at least one spring;
 a first lever arm connected to the first wedge block;
 a second lever arm connected to the second wedge block; and
 a link connected at a center to the pin, at a first end to the first lever arm, and at a second end to the second lever arm,
 wherein the at least one spring is a torsion spring connecting the cover to the link.

13. The adjustable wear assembly of claim 9, wherein the at least one spring includes a pair of constant force extension springs located at a mid-point of the inclined adjustment plate, the pair of constant force springs configured to pull the first and second wedge blocks towards each other.

14. The adjustable wear assembly of claim 1, further including:
 a compression-type coil spring configured to urge the at least one wedge block up the inclined adjustment plate away from the wear insert; and
 a leaf spring located between the cover and the at least one wedge block.

15. An adjustable wear assembly, comprising:
 a mounting component having a channel;
 a wear insert located within the channel;
 an adjustment plate located within the channel in contact with the wear insert;
 a mechanical biasing assembly located within the channel in contact with the adjustment plate to bias the adjustment plate toward the wear insert a greater amount as the wear insert becomes thinner;
 a mechanical wear indicator operatively connected to the mechanical biasing assembly to move with the mechanical biasing assembly and provide an indication of a thickness of the wear insert; and
 a cover connectable to the mounting component to close of a side of the channel.

16. The adjustable wear assembly of claim 15, wherein:
the adjustment plate includes:
- a first inclined protrusion; and
- a second inclined protrusion oriented opposite the first inclined protrusion relative to a length-wise midpoint of the adjustment plate; and the mechanical biasing assembly includes:
- a first wedge member associated with the first inclined protrusion;
- a second wedge member associated with the second inclined protrusion; and
- at least one spring located between the first and second wedge members to urge the first and second wedge members up the first and second inclined protrusions and away from the wear insert.

17. The adjustable wear assembly of claim 16, further including:
- a pin supporting the at least one spring;
- a disk connected to an end of the pin to rotate with the pin;
- a first lever arm connected to the first wedge member and a first edge of the disk; and
- a second lever arm connected to the second wedge member and a second opposing edge of the disk, wherein the at least one spring is a torsion spring connecting the cover to the disk.

18. The adjustable wear assembly of claim 16, further including:
- a pin;
- a bushing configured to slidingly receive the pin and support the spring;
- a first lever arm connected to the first wedge member;
- a second lever arm connected to the second wedge member; and
- a link connected at a center to the pin, at a first end to the first lever arm, and at a second end to the second lever arm, wherein the spring is a torsion spring connecting the cover to the link.

19. The adjustable wear assembly of claim 16, wherein the at least spring is a first constant force spring and the adjustable wear assembly includes a second constant force spring, the first and second constant force springs being located at a central portion of the inclined shim plate configured to pull the first and second wedge members towards each other.

* * * * *